United States Patent [19]

Kawagoe et al.

[11] Patent Number: 5,471,862
[45] Date of Patent: Dec. 5, 1995

[54] BEARING HAVING ARCH-SHAPED RECESSES AND METHOD OF MANUFACTURING THE SAME

[75] Inventors: Hideharu Kawagoe; Takayuki Shibayama; Yoshitaka Kondo, all of Nagoya; Motoji Komori, Gifu, all of Japan

[73] Assignee: Daido Metal Company Ltd., Nagoya, Japan

[21] Appl. No.: 337,141

[22] Filed: Nov. 10, 1994

Related U.S. Application Data

[63] Continuation of Ser. No. 30,717, Mar. 12, 1993, abandoned.

[30] Foreign Application Priority Data

Mar. 13, 1992 [JP] Japan .................................... 4-054884

[51] Int. Cl.$^6$ .................................................. B21K 21/16
[52] U.S. Cl. .................................... 72/355.4; 29/898.058
[58] Field of Search .................................. 72/370, 355.4, 72/355.6, 358; 29/898.054, 898.057, 898.058, 898.059; 384/279, 291

[56] References Cited

U.S. PATENT DOCUMENTS

| | | | |
|---|---|---|---|
| 1,722,787 | 7/1929 | Claus | 29/898.054 |
| 1,731,790 | 10/1929 | Payne | 29/898.058 |
| 2,660,076 | 11/1953 | May | 72/355.4 |
| 4,748,862 | 6/1988 | Johnston | 384/291 |
| 4,785,648 | 11/1988 | Budrean et al. | 72/355.6 |

FOREIGN PATENT DOCUMENTS

| | | | |
|---|---|---|---|
| 3718884 | 12/1988 | Germany | 72/355.6 |
| 145234 | 7/1985 | Japan | 72/358 |

*Primary Examiner*—Lowell A. Larson
*Attorney, Agent, or Firm*—Browdy and Neimark

[57] ABSTRACT

An annular bearing has its bearing surface on the inner surface. The bearing surface is formed to improve bearing properties, that is, to improve adaptability to an impact load and an imbalanced load. A method of manufacturing a bearing having such a bearing surface is given. An annular bearing blank, together with a mandrel having a plurality of arch-shaped ridges extending axially on the outer surface of the mandrel and a sleeve fitted on a periphery of the mandrel, is pushed into an inner hole of a molding die. The material is accordingly closed in a space defined by the mandrel, the inner hole, the sleeve and an ejector inserted into the bottom part of the inner hole. Thus, a plurality of arch-shaped recesses are formed extending axially on the inner surface of the bearing blank.

2 Claims, 2 Drawing Sheets

5,471,862

BEARING HAVING ARCH-SHAPED RECESSES AND METHOD OF MANUFACTURING THE SAME

This application is a continuation of application Ser. No. 08/030,717, filed Mar. 12, 1993, now abandoned.

BACKGROUND OF THE INVENTION

1. Field of the Invention

The present invention relates to a bearing used in vehicles, industrial machines, agricultural machines and the like, and more particularly, to an improvement in an annular bearing used in the case where an impact load and an imbalanced load are involved.

2. Description of the Related Art

Heretofore, there have been proposed various kinds of bearings which improve the shape of a bearing surface to cope with an impact load and an imbalanced load. According to one such proposal, the bearing surface is formed like a shape of a crown.

In recent years, in the light of high power of an internal combustion engine, demand for a bearing which can improve its operational performance and promptly respond to various changes of operational conditions has increased. However, a conventional bearing cannot satisfy such a demand.

SUMMARY OF THE INVENTION

Accordingly, an object of the present invention is to provide a bearing and a method of easily manufacturing the same in which by altering the shape of a bearing surface, its adaptability to an impact load and an imbalanced load can be improved, oil and grease can be excellently preserved, and the friction and wear resistance of the bearing can be improved.

To achieve the above objects, according to one aspect of the present invention, there is provided an annular bearing having a steel backing metal on its outer surface and a bearing surface on its inner surface, the bearing surface comprising a plurality of recesses with an arch-shaped cross section, which recesses extend axially on the bearing surface and are formed adjacent to each other.

According to another aspect of the present invention, there is provided a method of manufacturing the abovementioned annular bearing comprising the steps of mounting an annular bearing blank, such as in the form of a wrapped bushing, concentrically on an inlet of an inner hole of a molding die: inserting a mandrel into a center hole of the bearing blank with a sleeve being fitted around the periphery of the mandrel so as to be abutted on an upper end of the bearing blank, the mandrel being provided with a plurality of ridges each having an arch-shaped cross section and extending axially of the outer surface thereof in corresponding relationship with the recesses to be formed on the bearing surface and having an outer diameter slightly larger than an inner diameter of the bearing blank; lowering the bearing blank together with the mandrel and the sleeve along the inner hole of the molding die to such a degree that the bearing blank reaches an ejector which is placed on a bottom of the inner hole of the molding die, thereby molding the bearing blank in a space defined by the molding die, the mandrel, the sleeve and the ejector; and after the bearing is molded, raising the ejector above of the top surface of the molding die, and then lowering the sleeve and extracting the molded bearing, or raising the mandrel and the sleeve and thereafter raising the ejector above of the top surface of the molding die, thereby extracting the molded bearing.

Because the inner bearing surface of an annular bearing is shaped to have arch recesses, the contacting area between the bearing and its supporting shaft is reduced, and accordingly, the sliding resistance is lessened, and adaptability to an impact load and an imbalanced load is further improved. In the case where the bearing is used with oil, the arch-shaped recesses function as oil grooves or oil basins for lessening sliding resistance and wear, and for receiving foreign materials in the oil and discharging them outside of the bearing.

DESCRIPTION OF THE PREFERRED EMBODIMENT

Figure 1:
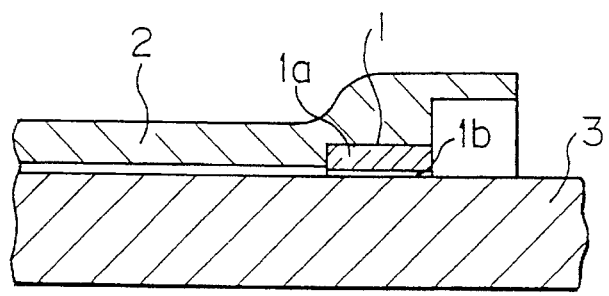
FIG. 1 is a cross section showing a bearing having arch-shaped recesses of the present invention incorporated into a front fork cylinder of a two-wheeled vehicle.

A preferred embodiment will now be described in detail with reference to the drawings. FIG. 1 is a sectional view showing a bearing 1 having arch-shaped recesses according to the present invention incorporated into a front fork cylinder of a two-wheeled vehicle, and illustrates a cylinder member 2 and a rod 3 which is supported by the bearing 1. The bearing 1 includes a steel backing metal 1a on the side of the outer surface and a bearing portion 1b on the side of inner surface. For the bearing portion 1b, a lead bronze alloy is used in a case utilizing oil lubrication; and in a case utilizing no lubrication, there is used a material produced by the following process; bronze powders are sintered to form a porous layer; the porous layer is impregnated with a resin and the surface is therefore coated with the resin.

Figure 2:
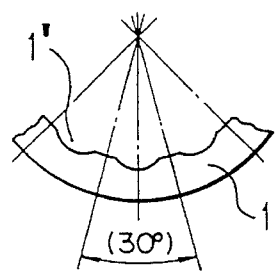
FIG. 2 is a partial sectional view of an embodiment of a bearing having arch-shaped recesses according to the present invention.

As illustrated in FIG. 2, recesses 1' each having an arch-shaped cross section of the same radius extending along the axis of the bearing 1 in the bearing surface inside of the bearing 1 are formed adjacent to each other. In the embodiment of FIG. 2, the number of the recesses 1' is 12, i.e. the recesses are spaced by 30° as illustrated, but the number of recesses may be within a range of 6 to 24, and preferably from 8 to 18. The effective depth of the arch-shaped recesses 1' is 20–110 μm, and more preferably, 30–100 μm. As illustrated, the space between adjacent grooves 1' is less than the width of the grooves.

Figure 3:
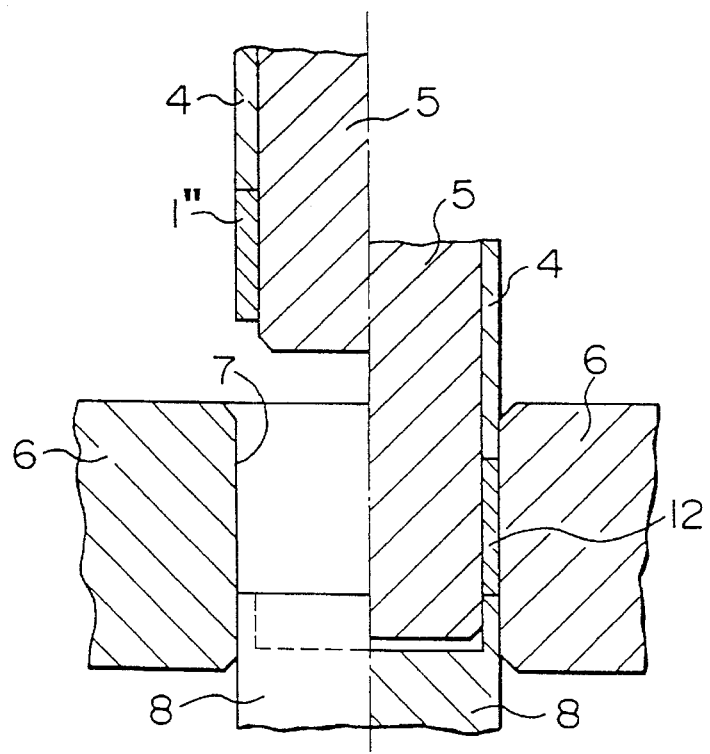
FIG. 3 is a sectional view of a device which manufacturers a bearing having arch-shaped recesses of the present invention and schematically shows its operation.
Figure 4:
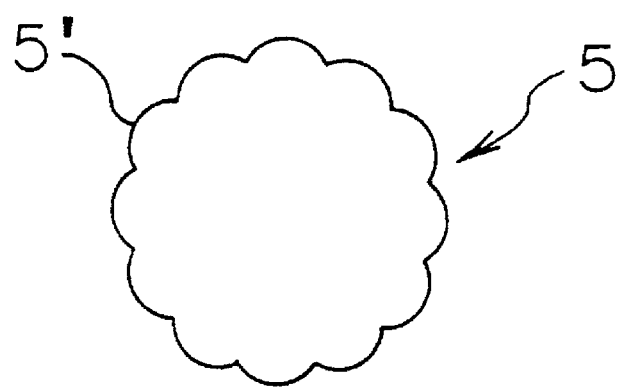
FIG. 4 is an end view of a mandrel in the device illustrated in FIG. 3.

FIG. 3 is a schematic view of a device for manufacturing a bearing having arch-shaped recesses constructed as stated above according to the present invention and shows the method of operating the device. The device comprises a mandrel 5, a molding die 6, a sleeve 4 and an ejector 8. The mandrel 5 forms a plurality of neighboring ridges 5' each having an arch-shaped cross section extending axially on the outer surface as shown in FIG. 4, which ridges 5' correspond to the arch-shaped recesses 1' to be formed on the bearing surface of the bearing which is to be manufactured, and the mandrel 5 diameter which is slightly larger than the inner diameter of the annular bearing blank which is to be formed into the bearing of the invention. The molding die 6 includes an inner hole 7 which is concentric with the mandrel 5 and which has an inner diameter which is larger than the outer diameter of the mandrel 5 substantially by the thickness of the bearing which is to be formed. The sleeve 4 is fitted on the periphery of the mandrel 5 to be axially slidable relative to the mandrel 5. The ejector 8 is slidably inserted into the bottom part of the inner hole 7 of the molding die 6.

The device for manufacturing a bearing according to the present invention is operated as follows. First, an annular bearing blank 1" whose bearing portion having a smooth surface (i.e. without grooves 1') is located on the inner surface of the bearing blank 1" and a steel backing metal on the outer surface thereof is mounted on the inlet of the inner hole 7 of the molding die 6 as shown at the left side of FIG. 3. The mandrel 5 is pushed into the center hole of the bearing blank 1" from above; the sleeve 4, fitted on the periphery of the mandrel 5, is abutted upon the top end surface of the bearing blank 1"; and the bearing blank 1" is lowered together with the mandrel 5 and the sleeve 4 along the inner hole 7 of the molding die 6 as shown at the right side of FIG. 3 to such a degree that it reaches the ejector 8. Accordingly, the bearing blank 1" is pushed by the sleeve 4 into to the space 12 defined by the mandrel 5, the inner hole 7 of the molded die 6, the sleeve 4 and the top of the ejector 8, and the arch-shaped recesses or grooves 1' are formed on the inner surface. The blank 1" is constrained in the axial direction by the sleeve 4 and the ejector 8. The ejector 8 is raised so as to allow the bearing blank 1" in which the recesses 1' are formed to be pushed out upwards with the mandrel 5 and the sleeve 4 from the inner hole 7 of the molding die 6, and then the sleeve 4 is lowered relative to the mandrel 5 so as to allow the formed bearing to be extracted from the mandrel 5. The depth of the arch-shaped recesses on the inner surface of the bearing which is formed according to the method described above measures 30–100 μm.

In the above method, after the annular bearing blank 1" is lowered along the inner hole 7 of the molding die 76 to such a degree that it reaches the ejector 8, whereby it is pushed to the space defined by the mandrel 5, the inner hole 7, the sleeve 4 and the ejector 8, a further processes of applying a force axially, both to the sleeve 4 and the ejector 8, may be added. With this process, the depth of the arch-shaped recesses 1' on the bearing surface may be further increased since the bearing blank 1" is contracted axially and expanded inwards. The depth of the arch-shaped recesses 1' of the bearing surface of the bearing which is formed by adding this process measures 40–110 μm.

The bearing having arch-shaped recesses of the present invention and manufactured according to the foregoing method has a form of a wrapped bushing of a DU dry bearing (registered trademark), a DX bearing (registered trademark) or a DAIBEST Bearing (registered trademark), but the present invention is not limited to these bearings.

Figure 5:
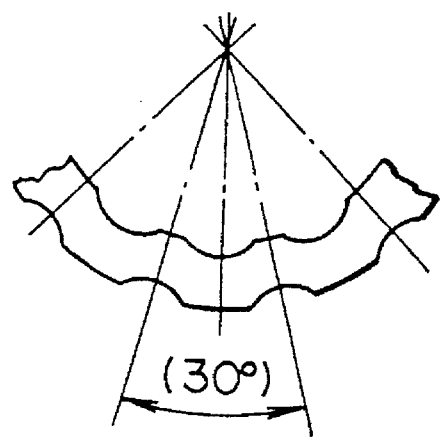
FIG. 5 is a partial end view indicating another embodiment which applies the present invention to an annular bearing of which both the inner and outer surfaces are bearing surfaces.

FIG. 5 shows an example in which twelve arch-shaped recesses are provided on each of the inner and outer bearing surfaces according to the present invention in an annular bearing of which both the inner and outer surfaces are bearing surfaces, as in a guide bearing of a front fork of a two-wheeled vehicle.

According to the foregoing embodiment, the present invention offers the following advantages.

A bearing having arch-shaped recesses of the present invention forms recesses having an arch-shaped cross section in which recesses extend axially on the bearing surface, thereby ameliorating the statical and kinetic frictional resistances, improving adaptability to an impact load and an imbalanced load, and increasing durability. When the bearing is used as an oil lubricating bearing, the arch-shaped recesses 1' preserve the oil, and thus bearing performance is further enhanced.

What is claimed is:

1. A method of manufacturing an annular bearing having a steel backing metal on its outer surface and a porous metal layer impregnated with a resin on its inner surface, said porous metal layer comprising 6–24 recesses each with a uniform arch-shaped cross section of 20–110 μm, which recesses extend axially on said porous metal layer and are formed adjacent to each other, said method comprising the steps of:

mounting an annular wrapped bushing concentrically on an inlet of an inner hole of a molding die;

inserting a mandrel into a center hole of said wrapped bushing with a sleeve being fitted around a periphery of said mandrel so as to abut an upper end of said wrapped bushing, said mandrel being provided with plurality of ridges each having an arch-shaped cross section having a height of 20–100 μm and extending axially of the outer surface thereof in corresponding relationship with said recesses to be formed on said porous metal layer and having an outer diameter slightly larger than an inner diameter of said wrapped bushing;

lowering said wrapped bushing together with said mandrel and said sleeve along said inner hole of said molding die to such a degree that said wrapped bushing reaches an ejector which is located on a bottom of said inner hole of said molding die, axially restraining said bushing, and applying an axial compression force to said restrained bushing by axially urging said sleeve and/or said ejector and thereby molding said wrapped bushing in a space defined by said molding die, said mandrel, said sleeve and said ejector and expanding said wrapped bushing inwards; and after said bearing is molded, raising said ejector above the top surface of said molding die, and then lowering said sleeve and extracting the molded bearing.

2. A method according to claim 1 wherein the arch-shaped cross-sections of said ridges of said mandrel are all of substantially the same radius so that the recesses formed on said bearing surface are all of substantially the same size.

\* \* \* \* \*